(12) United States Patent
Combs (10) Patent No.: US 11,364,741 B2
(45) Date of Patent: Jun. 21, 2022

(54) VEHICLE TIRE/WHEEL CHANGING DEVICE

(71) Applicant: Sam Combs, Anchorage, AK (US)

(72) Inventor: Sam Combs, Anchorage, AK (US)

(*) Notice: Subject to any disclaimer, the term of this patent is extended or adjusted under 35 U.S.C. 154(b) by 0 days.

(21) Appl. No.: 16/794,575

(22) Filed: Feb. 19, 2020

(65) Prior Publication Data
US 2021/0252911 A1   Aug. 19, 2021

(51) Int. Cl.
*B60B 29/00* (2006.01)
*B60B 30/10* (2006.01)

(52) U.S. Cl.
CPC .......... *B60B 29/001* (2013.01); *B60B 29/002* (2013.01); *B60B 2340/12* (2013.01); *B60B 2340/50* (2013.01)

(58) Field of Classification Search
CPC ..... B60B 29/001; B60B 29/002; B60B 30/02; B60B 30/06; B60B 30/08; B60B 2340/30; B60B 2340/32; B60B 2340/34; B60B 2340/36; B60B 2340/50; B60B 2340/70; B66F 5/025; B66F 9/06; B66F 2700/04; B66F 2700/123; B66F 2700/126
USPC ................. 157/1.11; 254/7 R, 7 B, 7 C, 4 B; 280/79, 4; 414/427
See application file for complete search history.

(56) References Cited

U.S. PATENT DOCUMENTS

| | | | | |
|---|---|---|---|---|
| 2,217,898 A | * | 10/1940 | Gemmill | B66F 5/00 414/427 |
| 2,379,587 A | * | 7/1945 | Moore | B60B 29/002 414/427 |
| 2,538,473 A | * | 1/1951 | Russell | B60B 29/002 414/426 |
| 2,583,216 A | * | 1/1952 | Hoffman | B60B 29/002 414/427 |
| 3,556,194 A | | 1/1971 | Farrington | |
| 4,460,306 A | * | 7/1984 | Hawkins | B60B 29/002 280/43.2 |
| 4,872,694 A | | 10/1989 | Griesinger | |
| 8,720,522 B2 | | 5/2014 | Combs | |
| 9,981,502 B2 | | 5/2018 | Souder et al. | |
| 10,479,140 B2 | | 11/2019 | Lindgren | |

(Continued)

OTHER PUBLICATIONS

International Search Report and Written Opinion in International Application No. PCT/US21/18802 dated Apr. 27, 2021, 13 pages.

*Primary Examiner* — Joseph J Hail
*Assistant Examiner* — J Stephen Taylor
(74) *Attorney, Agent, or Firm* — Berg Hill Greenleaf Ruscitti LLP (57) ABSTRACT

A device is provided for changing a wheel of a vehicle comprising a carriage assembly including two platform elements running longitudinally with one another and substantially parallel. First and second swingarms are connected to respective platform elements. The swingarms are rotatably positionable at a desired height above the carriage. A lift mechanism selectively raises or lowers the carriage during use. A tow bar allows the carriage to be pushed or pulled on wheels mounted to the carriage. A method of the invention includes mounting the wheel on the platform elements, raising free ends of the swingarms to a desired height so a knock out bar may be placed through a hub of the wheel, operating the lift mechanism to raise the wheel to a desired height, and aligning the wheel with the vehicle so the wheel may be secured to the vehicle.

16 Claims, 8 Drawing Sheets

(56) References Cited

U.S. PATENT DOCUMENTS

| 10,618,582 | B1* | 4/2020 | Liu | B62H 3/04 |
| 2012/0241392 | A1* | 9/2012 | Combs | B60B 29/001 |
| | | | | 211/21 |

* cited by examiner

VEHICLE TIRE/WHEEL CHANGING DEVICE

BACKGROUND OF THE INVENTION

In motorcycle racing, there is need to change tires in a quick, efficient and safe manner. Typically, two mechanics race out of a pit area with a replacement tire/wheel combination (hereinafter referred to as a wheel) and accompanying spacers to the motorcycle requiring service. The motorcycle may be raised on a stand to lift either the front or rear wheel that requires changing. Once the old wheel is removed, one mechanic attempts to install the axle through the front forks or back swingarm while holding the spacers in place. The second mechanic lifts and holds the new wheel at the same time, typically lifting the new wheel by the foot and hands. This awkward holding effort by the one mechanic usually results in failure to correctly align the axle thereby slowing the replacement of the new wheel and sometimes may damage the new wheel or axle. In the setting of a mechanic's garage or home where a motorcycle owner may wish to replace a wheel, the same sequence of events may occur which makes it difficult to replace the wheel quickly and efficiently.

One prior art reference that discloses a motorcycle wheel changing tool is disclosed in U.S. Pat. No. 8,720,522. This patent reference discloses a motorcycle wheel changing tool that utilizes a rolling carriage to immobilize the front or back wheel of a vehicle such as a motorcycle. A pair of swingarms and a tension spring holds the wheel in place along with a knockout retaining rod that is placed through the hub of the wheel. The entire carriage with mounted wheel can be rolled and/or lifted in place to work in conjunction with a motorcycle stand. A folding handle expands or contracts to accommodate different size wheel widths and the handle also functions to pull the carriage. Rolling wheels mounted to the underside of the carriage can be raised or lowered for different vehicles depending upon the height of the vehicle in relation to the wheel carriage. For additional support to the wheel, eye hooks can be raised or lowered to secure the sidewalls of the tire of the wheel. Two threaded rods are utilized to secure the carriage so that the carriage remains perpendicular to the wheel and keeps the carriage from bending or flexing excessively.

While the U.S. Pat. No. 8,720,522 represents a significant improvement with respect to a wheel changing tool or device, certain improvements to this invention have been evaluated in order to simplify the structure of the tool yet to maintain or improve overall functionality of the tool.

SUMMARY OF THE INVENTION

In accordance with the invention, a vehicle wheel changing device is provided, along with a method of changing the wheel of a vehicle. The invention is especially adapted for changing the wheel of a motorcycle; however, it should be appreciated that the present invention can be used in connection with other vehicles and therefore, the invention is not specifically limited to changing a wheel of a motorcycle.

The structure of the device includes a rolling carriage that can be easily rolled around any environment to include a mechanic shop, home garage, racing paddock, or the like. The device as described herein can be used to replace any front or back wheel of a motorcycle that may be previously lifted on a lifting stand; however, it is not a requirement that the wheel to be replaced be lifted on a stand if other means are available to steady and hold the motorcycle.

As will be apparent from the description herein, there are various objects of the invention that are achieved by the structure and functionality of both the device and method of the invention.

One object of the invention is to provide a means to hold a motorcycle wheel in place and immobilize the wheel so that it can be quickly and efficiently replaced.

Another object is to reduce the amount of manpower and effort associated with changing a wheel in which changing can be achieved by one individual as opposed to two or more individuals.

Another object is the invention is to provide a relatively lightweight, mobile device that can be easily transported to any desired location.

Another object is to simplify the number of required actions in changing the wheel of a vehicle in which the device of the invention automatically compensates for correctly aligning the replacement wheel and stabilizes the weight of the wheel so that it can be more easily replaced.

Yet another object of the invention is to provide a device that can be easily disassembled for compact shipping and for subsequent assembly by the end-user.

Yet another object of the invention is to provide a device that can be easily transported as a single, compact unit. As further described, the invention has a foldable swingarms and a foldable tow bar that enable the device to be of a minimum size during storage.

The device of the invention may be generally described as carriage assembly that comprises two platforms that are adjustable in width to accommodate any size tire. The platforms have a common side edge which run longitudinally together along a length of the carriage assembly. The platforms are adjustably separated from one another depending upon the width of the tire. The platforms remain aligned to one another by a pair of supporting sleeves mounted on the underside of the platforms, along with at least one retention spring.

Once a wheel is mounted on the carriage assembly, it is held between a pair of clamps that are mounted on the respective outer edges of the two platforms. These clamps are L shaped units that are rotatably mounted to the respective platforms enabling the clamps to further accommodate a width of the wheel mounted to the carriage.

A swingarm is mounted to each platform and is secured to the platform by thumbscrews or any other adjustable hardware secured to the outer side of the platform. The swingarms can be raised or lowered to account for different sized wheels. Each arm has a forked end that defines a slot between the forks which is adapted to receive a knockout rod/axle or pseudo-axle.

An initial adjustment of the device involves measuring a height of the center of the axle of the wheel to be replaced. The initial measurement of the centerline of the axle to the ground provides the dimension needed to set up the device enabling the knockout rod or axle to be placed at the desired height. When the replacement wheel is aligned with the motorcycle and the knockout rod is positioned through the front forks of the motorcycle or through the rear swingarm of the motorcycle, the axle of the wheel can be pushed through thereby ejecting the knockout rod while keeping the wheel in position.

Another feature of the invention is a height adjustment platform that incorporates a lift mechanism enabling the carriage assembly to be raised or lowered. The lift mechanism of the invention includes upper and lower support plates, a screw jack, and a threaded screw jack sleeve or bushing that receives the screw jack. Alignment support for the lift mechanism includes an alignment tube and an alignment rod that is received within the alignment tube. The screw jack is operated to raise or lower the carriage assembly.

The lower surfaces of the platform pieces include a plurality of ball bearing wheels that enable the carriage to easily swivel while moving the device. In one configuration, there are four ball bearing wheels, one wheel located towards each corner of the carriage assembly. Additional wheels may be mounted to the lower surface of the carriage at the forward or front end thereof which enables the device to remain mobile when the lift mechanism has raised the platform or if the carriage with wheel mounted thereto is tipped forward.

The height adjustment platform may further include ball bearing wheels mounted to the lower support plate that also allow the entire carriage assembly to roll when the lift mechanism has raised a wheel.

According to an embodiment of the invention, it includes the carriage assembly with two support platforms. The carriage assembly is configured to automatically change the effective width to accommodate different sized wheels mounted to the carriage assembly. This embodiment further includes swingarms that are especially adapted for rotatable use in which the swingarms are adjustable to accommodate the particular height at which the knockout bar is to be installed. In other words, the swingarms are pivotally mounted to the platform and the swingarms are rotated such that they are aligned at a proper height for mounting the wheel on the motorcycle. The swingarms may be stored when not in use by resting the swingarms on and secured by clips mounted to the support platforms.

One optional feature for maintaining the swingarms at a supported and desired spacing from one another is a swingarm retaining spring that extends between the swingarms and which is passed through the spokes of the motorcycle wheel.

As will be appreciated from the description that follows, the device of the invention allows for multiple adjustments to accommodate any size tire/wheel combination that may be encountered.

According to one aspect of the invention, it includes a device for changing a wheel of a vehicle, said device comprising: a carriage assembly including two platform elements running longitudinally with one another and substantially parallel; first and second swingarms, said first swingarm connected to one platform element and the second swingarm connected to the other platform element, each swingarm having a first end rotatably connected to the corresponding platform element, and a second end that is rotatably positionable at a desired height above said carriage assembly; a lift mechanism connected to said carriage assembly, said carriage assembly being selectively raised or lowered to thereby raise or lower the carriage assembly; at least two sleeve supports secured between said platform elements enabling said platform elements to be separated from one another, yet remaining substantially longitudinally and parallel aligned with one another; at least one platform retention spring mounted adjacent said at least two sleeve supports and mounted between said platform elements, thereby providing a biasing force to maintain the platform elements at a desired spacing between one another depending upon a width of the wheel mounted to said device; a clamp mounted to each said platform element; and a tow bar mounted to said carriage assembly enabling said carriage assembly to be pushed or pulled.

Additional optional features of the first aspect of the invention include: a plurality of wheels mounted to a lower surface of the carriage assembly; wherein said lift mechanism includes an upper plate connected to said carriage assembly, a lower plate spaced from said upper plate, a bushing placed between said upper and lower plates, and a threaded lift screw cooperating with said bushing, wherein rotation of said screw jack selectively raises and lowers said device; wherein said lift mechanism further includes an alignment tube and an alignment sleeve placed within said alignment tube, said alignment tube and said alignment sleeve mounted to said lift mechanism to control alignment of raising and lowering of said device; wherein said clamp is L-shaped having a first side extending substantially perpendicular to said carriage when a wheel is mounted to said device, and further having a second side extending substantially parallel to said carriage when a wheel is mounted to said device; wherein each said platform includes an opening to receive said second side and wherein each said clamp is rotatable about an axis extending substantially parallel to an upper surface of said carriage; a swingarm retention spring placed through a rim of the wheel and interconnecting said first and second swingarms.

According to another aspect of the invention, it includes a method of changing a wheel of a vehicle, said method comprising the steps of: providing a carriage assembly including two platform elements running longitudinally with one another and substantially parallel; providing first and second swingarms, said first swingarm connected to one platform element and the second swingarm connected to the other platform element, each swingarm having a first end rotatably connected to the corresponding platform element, and a second end that is rotatably positionable at a desired height above said carriage assembly; providing a lift mechanism connected to said carriage assembly; providing at least two sleeve supports secured between said platform elements enabling said platform elements to be separated from one another, yet remaining substantially longitudinally and parallel aligned with one another; providing at least one platform retention spring mounted adjacent said at least two sleeve supports and mounted between said platform elements, thereby providing a biasing force to maintain the platform elements at a desired spacing between one another depending upon a width of a wheel to be mounted to said device; providing a tow bar mounted to said carriage assembly enabling said carriage assembly to be pushed or pulled; mounting the wheel on said platform elements and between said clamps; raising free ends of said swingarms to a desired height; and raising said carriage assembly to a desired height Additional optional features of the second aspect of the invention include: providing a clamp mounted to each said platform element wherein opposite sides a tire of said wheel are supported by said clamps; providing wheels attached to a lower surface of said carriage assembly and rolling said device while in use.

According to yet another aspect of the invention, it may be considered a device for changing a wheel of a vehicle, said device comprising: a carriage assembly including two platform elements running longitudinally with one another and substantially parallel; first and second swingarms, said first swingarm connected to one platform element and the second swingarm connected to the other platform element, each swingarm having a first end rotatably connected to the corresponding platform element, and a second end that is rotatably positionable at a desired height above said carriage assembly; a lift mechanism connected to said carriage assembly, said carriage assembly being selectively raised or lowered to thereby raise or lower the carriage assembly; at least two sleeve supports secured between said platform elements enabling said platform elements to be separated from one another, yet remaining substantially longitudinally and parallel aligned with one another; and a tow bar mounted to said carriage assembly enabling said carriage assembly to be pushed or pulled.

Additional optional features of the third aspect of the invention include: at least one platform retention spring mounted adjacent said at least two sleeve supports and mounted between said platform elements, thereby providing a biasing force to maintain the platform elements at a desired spacing between one another depending upon a width of the wheel mounted to said device; a clamp mounted to each said platform element; a plurality of wheels mounted to a lower surface of the carriage assembly; said lift mechanism includes an upper plate connected to said carriage assembly, a lower plate spaced from said upper plate, a bushing placed between said upper and lower plates, and a threaded lift screw cooperating with said bushing, wherein rotation of said screw jack selectively raises and lowers said device; said lift mechanism further includes an alignment tube and an alignment sleeve placed within said alignment tube, said alignment tube and said alignment sleeve mounted to said lift mechanism to control alignment of raising and lowering of said device; wherein said clamp is L-shaped having a first side extending substantially perpendicular to said carriage when a wheel is mounted to said device, and further having a second side extending substantially parallel to said carriage when a wheel is mounted to said device wherein each said platform includes an opening to receive said second side and wherein each said clamp is rotatable about an axis extending substantially parallel to an upper surface of said carriage assembly; a swingarm retention spring placed through a rim of the wheel and interconnecting said first and second swingarms.

Further objects and advantages of the invention will become apparent from a review of the following detailed description taken in conjunction with the drawings herein.

DETAILED DESCRIPTION

Figure 1:
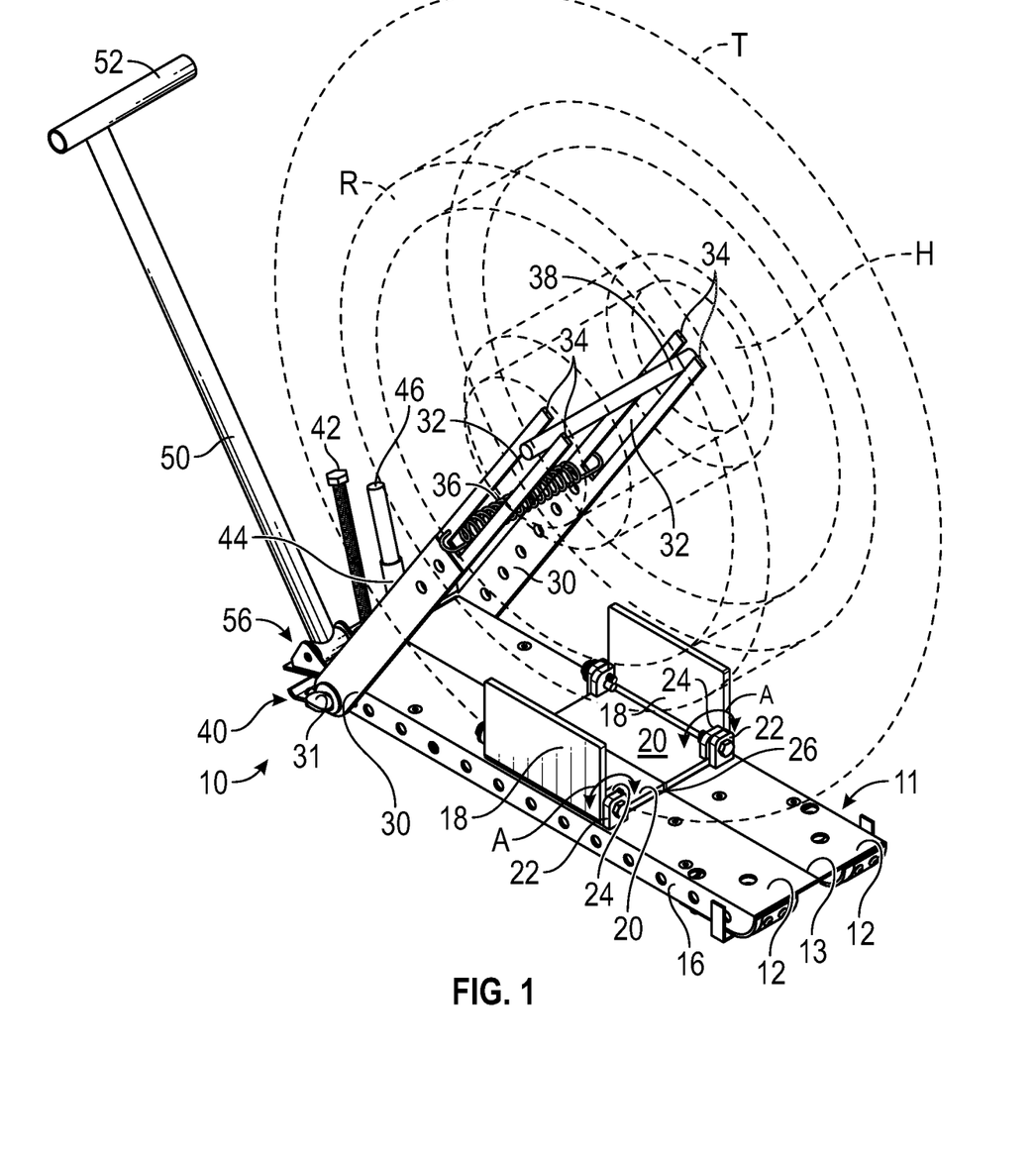
FIG. 1 is a perspective view of one preferred embodiment of the device of the invention showing a motorcycle wheel mounted and ready for changing.
Figure 2:
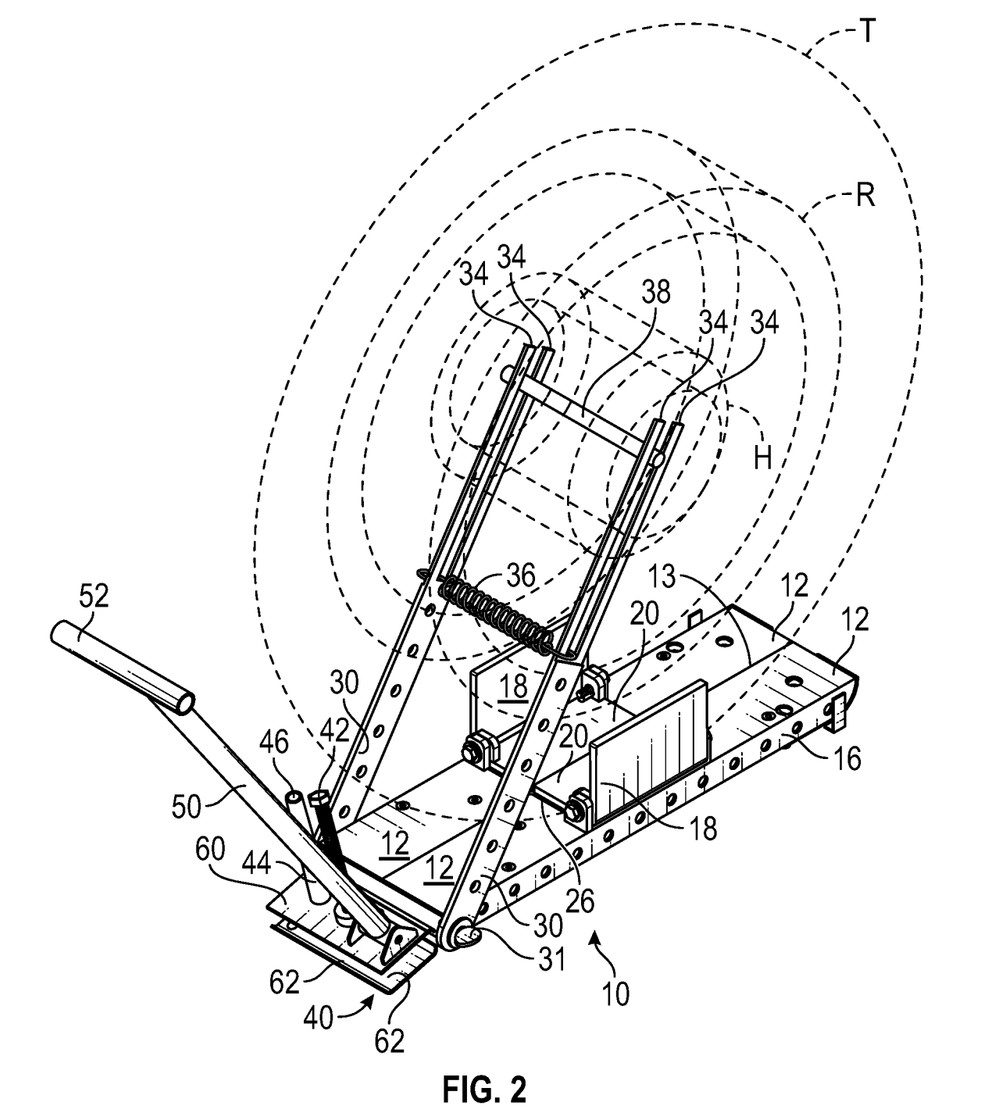
FIG. 2 is a reverse perspective view of the device.

Referring first to FIGS. 1 and 2, these illustrate a preferred embodiment of the device of the invention. The device 10 is generally described as a carriage assembly that may be transported by a rolling motion facilitated by a platform with wheels and a tow bar grasped by a user during transport. The platform is selectively raised and lowered during operation by use of a lift mechanism 40. A pair of swingarms 30 are incorporated on the platform and are selectively rotatable to accommodate stabilization of the wheel mounted to the platform and to facilitate use of a knockout bar or pseudo-axle. Side clamps 18 are also incorporated on the platform that contact the tire and/or rim of the wheel to stabilize the wheel as mounted.

Structural details of the invention in the illustrated preferred embodiment more specifically include a mounting platform or deck 11 comprising two platform elements 12. As shown, the platform elements 12 are disposed side-by-side and substantially parallels to one another. The particular side-by-side arrangement of the platform elements 12 may be adjustable as to the effective combined width between the opposite side edges of the platform elements, as determined by the width of the wheel that is mounted to the mounting platform. More specifically, the platform elements 12 may contact one another along seam 13 defining a minimum width or may be separated from one another along seam 13 in the case of a tire having a width that is wider than the combined width of the platform elements. The platform elements further include a side flanges 16 that extend substantially perpendicular to the ground; therefore, the platform elements 12 can also be described as platform angles.

FIG. 1 also illustrates an example wheel in broken lines comprising a tire T, a rim R, and a hub H of the rim R. The rim R further includes a spoke arrangement (not shown) whereby the hub H is centrally supported within the rim R. As shown, the side clamps 18 are rotatably mounted on respective platform elements 12. The side clamps 18 are L-shaped and include a vertically extending portion and a horizontally extending base 20 as the device is oriented in FIG. 1. The side clamps 18 are more specifically rotatable about respective clamp hinges in which each clamp hinge includes an exterior mounting eye 22 and a corresponding interior mounting eye 24 that receives a pin. As shown, a clamp hinge is located on each opposite longitudinal end of the side clamps 18. Openings are formed through the platform elements 12 defined by edges 26 enabling the side clamps 18 to rotate about the respective hinges, indicated by the rotational arrows A in FIG. 1. The openings 26 are covered in the orientation of the side clamps 18 as shown in FIG. 1.

Swingarms 30 are rotatably mounted to each platform element 12, such as by a thumbscrew 31 or other releasable locking element. The swingarms are raised to the appropriate height so that the swingarms may facilitate the insertion/removal of a knockout bar 38 placed through the hub of the replacement wheel. The structure of the swingarms 30 more specifically include end forks 34 spaced from one another thereby creating a slot 32 therebetween. As shown, the length of the slot 32 enables the knockout bar 38 to be easily positioned at a precise desired height with respect to a mounted wheel. In order to keep the swingarms aligned with the platform and to stabilize holding of the tire, a retention spring 36 is provided which is placed between spokes or openings in the rim R. In this way, a tensioning force is continually applied to maintain the swingarms in their proper position. Once the swingarms are rotated to their desired position, the thumbscrews 31 may be tightened.

Figure 4:
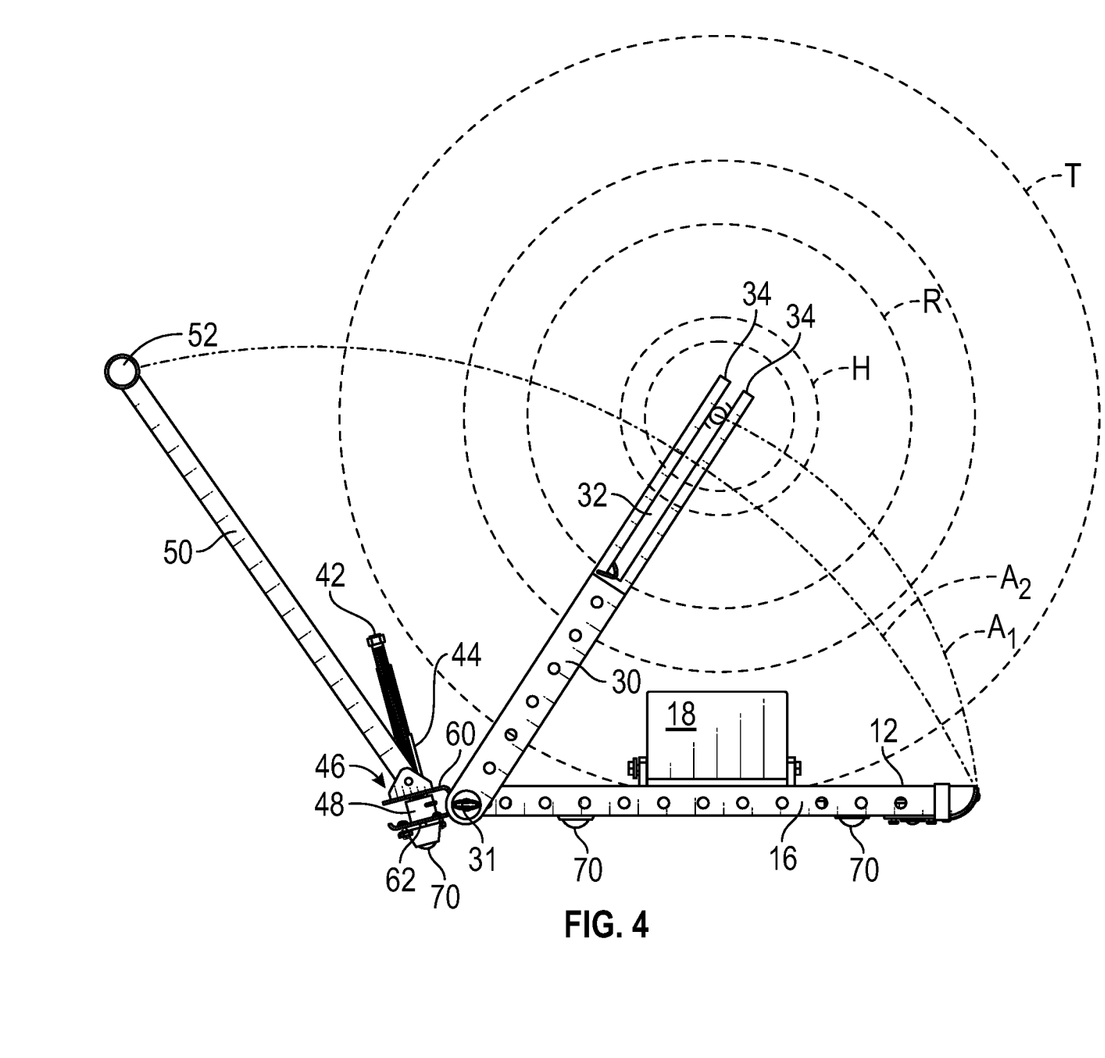
FIG. 4 is a side elevation view of the device.
Figure 6:
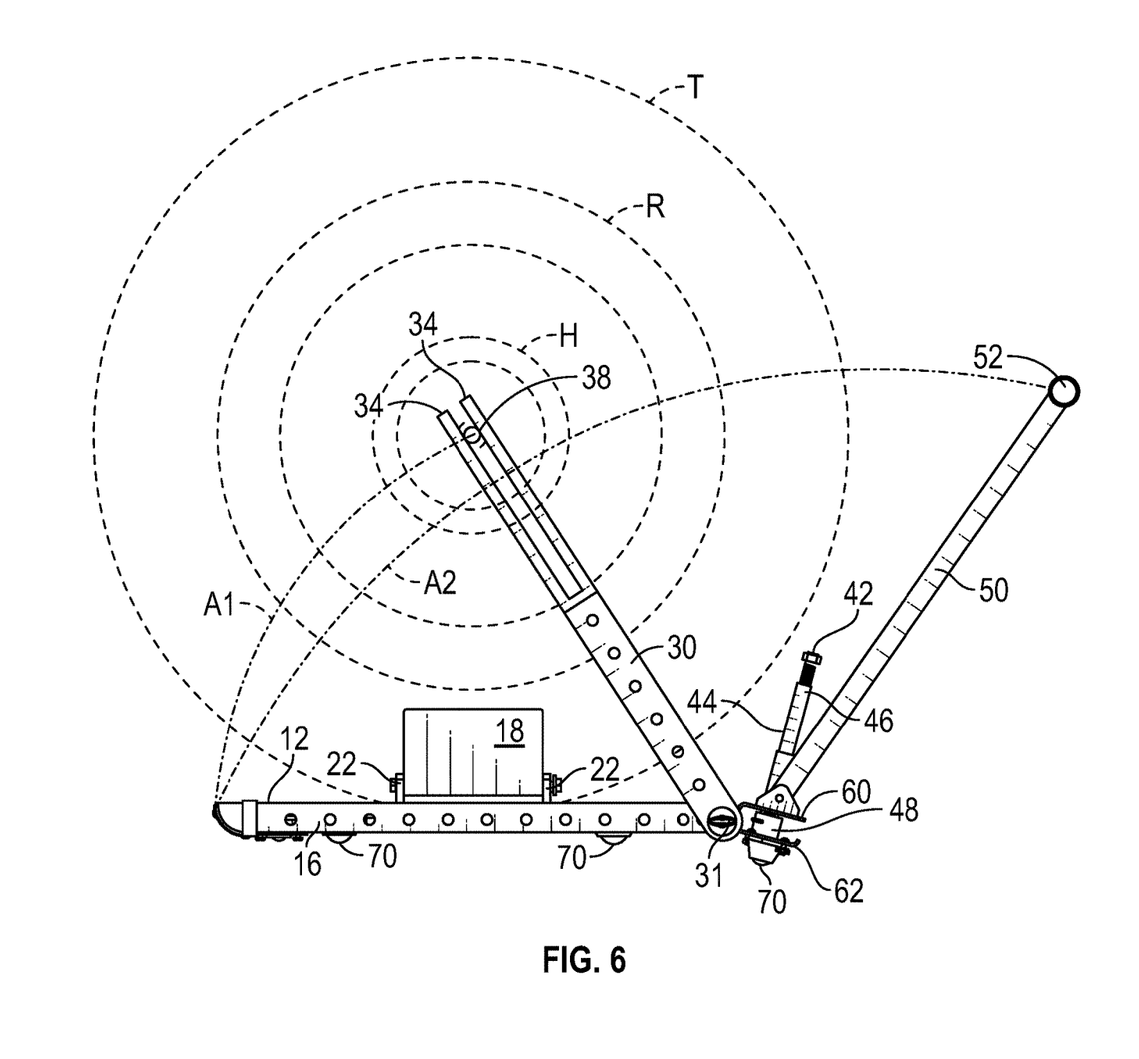
FIG. 6 is a reverse elevation view of the device.

Lift mechanism 40 allows height adjustment for the carriage assembly thereby raising/lowering the wheel to the desired height. Referring also to FIGS. 4 and 6, the lift mechanism 40 includes an upper support plate 60 and a lower support plate 62 in which the upper support plate 60 is attached to one of the platform elements 12. A threaded bushing 48 is mounted between the support plates and is secured to the lower interior surface of the upper support plate 60. A screw jack 42 extends through an opening (not shown) in the upper support plate 60. The upper end of the screw jack has a nut that can be operated by a standard electrical or manual drill and socket tool. The carriage assembly is raised or lowered by screwing or unscrewing the screw jack 42 by rotation of the screw jack. For example, with respect to a standard threaded bushing and screw jack, rotation of the screw jack in a clockwise rotation results in progressive movement of the screw jack 42 through the bushing 48 thereby raising the upper support plate 60. Rotation of the screw jack in a counterclockwise rotation results in progressive withdrawal of the screw jack from the bushing thereby lowering the upper support plate.

In order to keep the lift mechanism properly supported so that it may be easily lifted without binding, an alignment tube 44 is mounted to the upper surface of the upper support plate 60 and an alignment rod 46 extends through the tube and through another opening (not shown) in the upper support plate. As the lift mechanism 40 is operated, the alignment rod 46 slides within the alignment tube 44 thereby maintaining the upper and lower support plates in a substantially parallel relationship.

Also mounted to the upper surface of the upper support plate 60 is a hinge assembly 56 which connects with a tow bar 50. The tow bar 50 is rotatable about a hinge 56 enabling a user to easily move the carriage assembly during use. The free end of the tow bar 50 may include a transverse handle 52 or other type of hand gripping feature enhancing the user's ability to pull or push the carriage assembly. The tow bar also gives the user the ability to lift the carriage assembly over the rear bar of a bike stand to orient the tool to the proper location.

Figure 3:
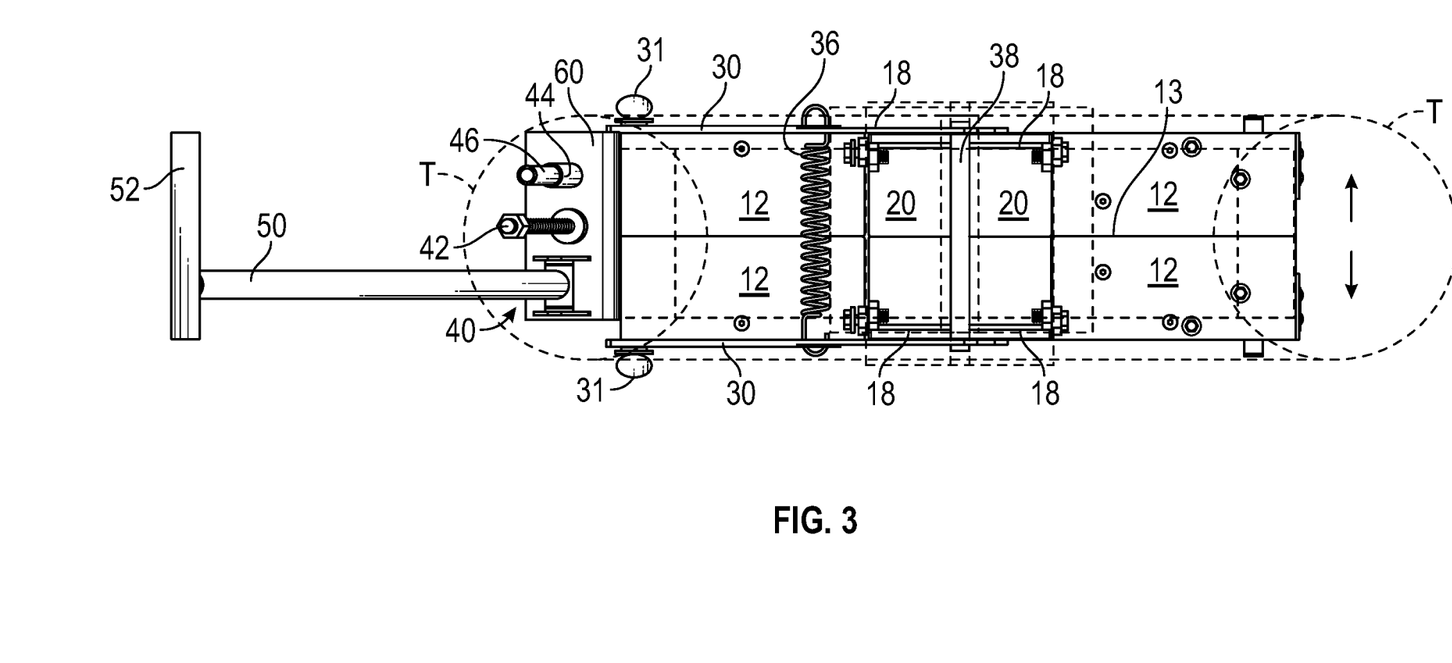
FIG. 3 is a top plan view of the device.

Referring to FIG. 3, the elevation view illustrates the longitudinally aligned relationship of the carriage assembly with respect to a mounted wheel. As shown, the wheel is substantially centered over the platform elements 12, and the opposite sides of the tire T may slightly overhanging the length of the carriage assembly, yet the tire T is still substantially supported by not only the side clamps 18, but also the swingarms 30. As mentioned, the retaining spring 36 provides a continual tensioning force to ensure that the swingarms 30 are maintained in their desired position with respect to the mounted wheel. As further shown in FIG. 3, the particular orientation of the tow bar 50 allows it to easily clear the outer edge of the tire such that the user can push/pull the carriage assembly without obstruction from the tire.

Referring to FIGS. 4 and 6, additional details are shown with respect to the particular arc $A_1$ that the swingarm 30 may traverse thereby aligning a knockout bar 38 with the geometric center of the hub H so that the knockout bar or axle may be precisely positioned.

Arc $A_2$ in FIG. 4 shows the general rotational capability of the tow bar 50 so that it can be selectively positioned to push/pull the carriage assembly or stowed when not in use. In the stowed position, the tow bar is rotated and rests on the platform elements 12. The tow bar may be secured to the platform element with fasteners (not shown).

Figure 5:
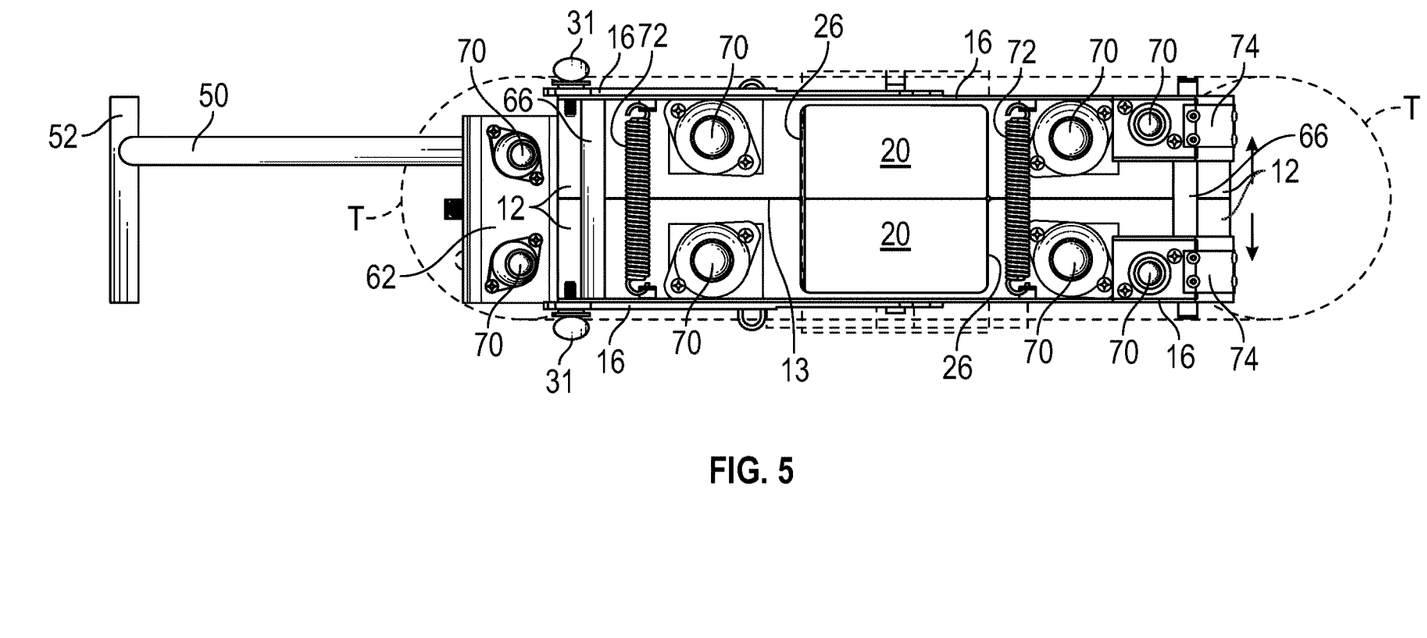
FIG. 5 is a bottom plan view of the device.

Referring to FIG. 5, yet further structural details of the device are shown. In order to control the desired width of the carriage assembly to accommodate the width of a mounted tire, two sleeve supports 66 are shown, one mounted at each opposite end of the carriage assembly. The sleeve supports each include an outer tube and an interior support rod (not shown) that is slidable within the outer tube. One end of the outer tube is secured to the abutting flange 16. The interior support rod received in the outer tube is secured to the opposite flange 16. In this way, the respective platform elements may be separated from one another or placed in contact with one another along seam 13, depending upon the width of the tire mounted to the device. The tube/rod arrangement ensures a selectively variable width for the carriage assembly and maintains the platform elements in a longitudinally aligned and parallel orientation. As further shown in FIG. 5, springs 72 are mounted between and secured to each flange 16 such that a continual biasing force is applied to the platform elements 12. In this way, in combination with the sleeve supports 66, the platform elements 12 remain aligned with one another and excessive shifting or bowing of the platform elements is prevented.

FIG. 5 also shows a group of rollers 70, such as ball bearing rollers, that enables the carriage assembly to be rolled along the ground. As shown, there are two rollers mounted to each platform element 12 as well as two rollers mounted to the forward side or forward edge of the carriage assembly. FIG. 5 also shows two rollers 70 mounted to the lower support plate 62. The rollers 70 mounted to the lower support plate specifically assist in enabling the carriage assembly to be rolled if the carriage assembly has been raised by the lift mechanism 40.

An enhancing feature of the invention to allow the carriage assembly to move while the device is used includes two skid plates 74 located at the lower front of the carriage assembly. Accordingly, when the carriage assembly is tipped forward, the skid plates will contact the ground allowing the device to keep rolling and protect the carriage assembly.

Figure 7:
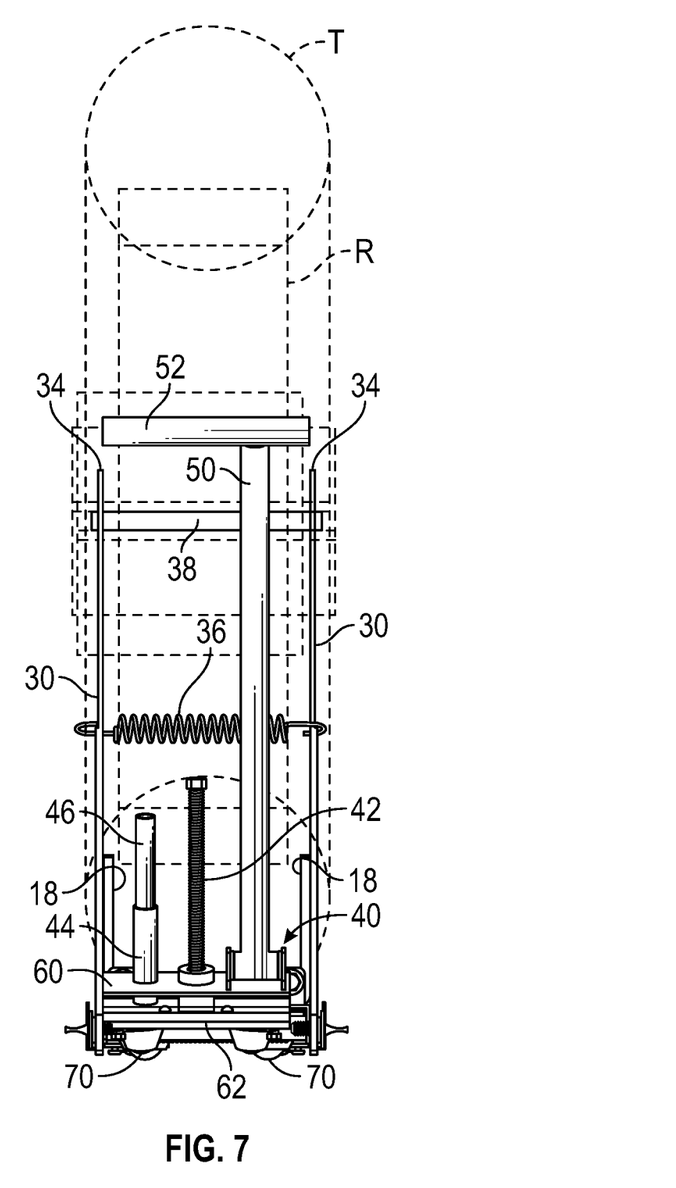
FIG. 7 is a rear elevation view of the device.
Figure 8:
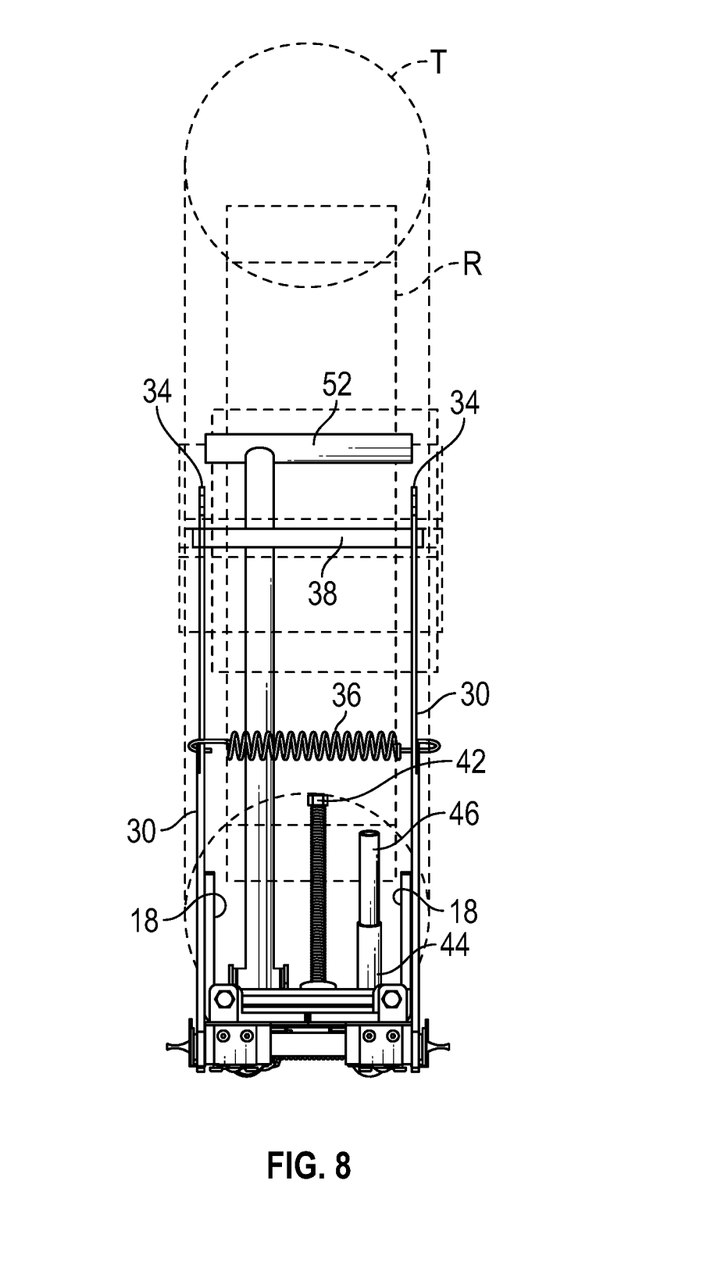
FIG. 8 is a front elevation view of the device.

Referring to FIGS. 7 and 8, these further illustrate the aligned relationship of a wheel mounted to the device of the invention. As illustrated, the swingarms 30 rise vertically from the carriage assembly and assist in maintaining the wheel in its vertical orientation. The knockout bar 38 extends substantially horizontally to ensure there is a quick and easy alignment of the knockout bar with the axle of the wheel. The lower portion of the tire is securely retained in the gap or space between the side clamps 18. Again, the tow bar 50 is conveniently located so that it may effectively push/pull the carriage assembly yet is spaced from the outside edges of the tire T.

According to one preferred method of the invention, a user encounters a situation in which it is necessary to replace the wheel of a vehicle such as a motorcycle. The user secures the replacement wheel and mounts the wheel on the carriage assembly such that the tire rests on the platform elements 12 between the clamps 18. The swingarms 30 are raised to the desired height and the knockout bar 38 is located so that it may extend through the opening in the hub assembly of the wheel. The spring 36 is routed through an opening in the rim of the wheel and secured to the swingarms 30. The wheel may be selectively raised by use of the lift mechanism 40. To raise the carriage assembly, a user selectively rotates the screw jack 42, such as by use of a drill and socket tool. Once the wheel is raised to the desired height, fine adjustments can be made to locate the knockout bar so that it is aligned with the axle opening through the hub. Once aligned, the axle of the wheel may then be inserted to thereby displace knockout bar. The carriage assembly may then be lowered to thereby disengage the carriage assembly from the wheel that is now mounted to the vehicle.

While the invention herein has been described with respect to one or more preferred embodiments, the invention is not strictly limited to these preferred embodiments. Therefore, the invention can be effectively modified commensurate with the scope of the claims appended hereto.

What is claimed is:

1. A device for changing a wheel of a vehicle, said device comprising:

a carriage assembly including two platform elements running longitudinally with one another and substantially parallel, said carriage assembly having a length and width;

first and second swingarms, said first swingarm connected to one platform element and the second swingarm connected to the other platform element, each swingarm having a first end rotatably connected to the corresponding platform element, and a second end that is rotatably positionable at a desired height above said carriage assembly;

at least one platform retention spring extending between said opposite sides of said carriage assembly, thereby providing a biasing force to maintain the platform elements at a desired spacing between one another depending upon a width of the wheel mounted to said device;

a clamp mounted to each said platform element, each said platform element including an opening to receive said clamp and wherein each said clamp is rotatable about an axis extending along said length of said carriage assembly and substantially parallel to an upper surface of said carriage assembly; and a tow bar mounted to said carriage assembly enabling said carriage assembly to be pushed or pulled.

2. The device, as claimed in claim 1, further including:
a plurality of wheels mounted to a lower surface of the carriage assembly.

3. The device, as claimed in claim 1, further including:
a lift mechanism connected to said carriage assembly for selectively raising or lowering the carriage assembly, said lift mechanism having an upper plate connected to said carriage assembly, a lower plate spaced from said upper plate, a bushing placed between said upper and lower plates, and a threaded lift screw cooperating with said bushing, wherein rotation of said lift screw selectively raises and lowers said device.

4. The device, as claimed in claim 3, wherein:
said lift mechanism further includes an alignment tube and an alignment sleeve placed within said alignment tube, said alignment tube and said alignment sleeve mounted to said lift mechanism to control alignment of raising and lowering of said device.

5. The device, as claimed in claim 1, wherein:
each said clamp is L-shaped having a first side extending substantially perpendicular to said carriage when a wheel is mounted to said device, and further having a second side extending substantially parallel to said carriage when a wheel is mounted to said device.

6. The device, as claimed in claim 1, further including:
a swingarm retention spring placed through a rim of the wheel and interconnecting said first and second swingarms.

7. The device, as claimed in claim 1, further including:
at least two sleeve supports secured to opposite sides of said carriage assembly and extending the width between the opposite sides of said carriage assembly enabling said platform elements to be separated from one another, yet remaining substantially longitudinally and parallel aligned with one another.

8. A device for changing a wheel of a vehicle, said device comprising:
a carriage assembly including two platform elements running longitudinally with one another and substantially parallel, said carriage assembly having a length and width;

first and second swingarms, said first swingarm connected to one platform element and the second swingarm connected to the other platform element, each swingarm having a first end rotatably connected to the corresponding platform element, and a second end that is rotatably positionable at a desired height above said carriage assembly;

a lift mechanism connected to said carriage assembly for selectively raising or lowering the carriage assembly said lift mechanism having an upper plate connected to said carriage assembly, a lower plate spaced from said upper plate, and threaded lift screw, wherein rotation of said lift screw selectively raises and lowers said device;

an alignment tube mounted to an upper surface of the upper support plate;

an alignment sleeve extending through the alignment tube, said alignment sleeve having an upper end extending above said alignment tube, wherein as the lift mechanism is operated to raise and lower the carriage assembly, the alignment sleeve slides within the alignment tube thereby maintaining the upper and lower support plates in a substantially parallel relationship; and a tow bar mounted to said carriage assembly enabling said carriage assembly to be pushed or pulled.

9. The device, as claimed in claim 8, further including:
at least one platform retention spring extending between said opposite sides of said carriage assembly, thereby providing a biasing force to maintain the platform elements at a desired spacing between one another depending upon a width of the wheel mounted to said device.

10. The device, as claimed in claim 8, further including:
a clamp mounted to each said platform element.

11. The device, as claimed in claim 10, wherein:
each said clamp is L-shaped having a first side extending substantially perpendicular to said carriage when a wheel is mounted to said device, and further having a second side extending substantially parallel to said carriage when a wheel is mounted to said device.

12. The device, as claimed in claim 8, further including:
a plurality of wheels mounted to a lower surface of the carriage assembly.

13. The device, as claimed in claim 8, wherein:
each said platform element includes an opening to receive said second side of each said clamp and wherein each said clamp is rotatable about an axis extending along said length of said carriage assembly and substantially parallel to an upper surface of said carriage assembly.

14. The device, as claimed in claim 8, further including:
a swingarm retention spring placed through a rim of the wheel and interconnecting said first and second swingarms.

15. A device for changing a wheel of a vehicle, said device comprising:
a carriage assembly including two platform elements running longitudinally with one another and substantially parallel, said carriage assembly having a length and width;

first and second swingarms, said first swingarm connected to one platform element and the second swingarm connected to the other platform element, each swingarm having a first end rotatably connected to the corresponding platform element, and a second end that is rotatably positionable at a desired height above said carriage assembly;

a lift mechanism connected to said carriage assembly for selectively raising or lowering the carriage assembly;

at least one sleeve support secured to opposite sides of said carriage assembly and extending the width between the opposite sides of said carriage assembly enabling said platform elements to be separated from one another, yet remaining substantially longitudinally and parallel aligned with one another;

a clamp mounted to each said platform element;

a tow bar mounted to said carriage assembly enabling said carriage assembly to be pushed or pulled; and each said platform element includes an opening to receive a side of each said clamp, wherein each said clamp is rotatable about an axis extending along said length of said carriage assembly and substantially parallel to an upper surface of said carriage assembly.

16. The device, as claimed in claim 15, further including:

at least one platform retention spring mounted adjacent said at least one sleeve support and extending between said opposite sides of said carriage assembly, thereby providing a biasing force to maintain the platform elements at a desired spacing between one another depending upon a width of the wheel mounted to said device.

* * * * *